April 28, 1953
J. W. BITLER
2,636,581
CLUTCH AND BRAKE DEVICE
Filed Oct. 2, 1948
3 Sheets-Sheet 1
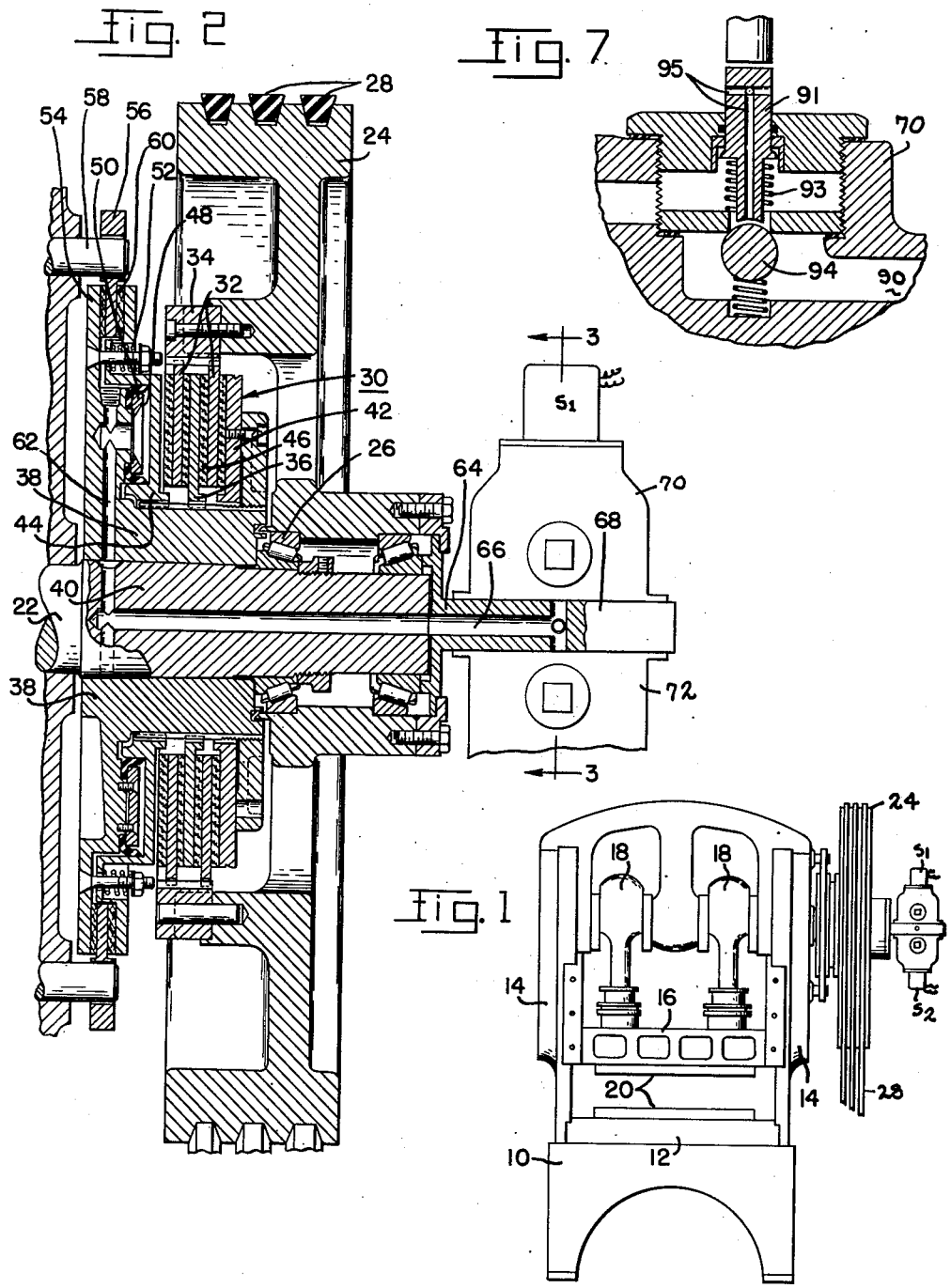
INVENTOR
JOHN W. BITLER
By Toulmin & Toulmin
ATTORNEYS April 28, 1953   J. W. BITLER   2,636,581
CLUTCH AND BRAKE DEVICE
Filed Oct. 2, 1948   3 Sheets-Sheet 2

INVENTOR
JOHN W. BITLER
By
Toulmin & Toulmin
ATTORNEYS

April 28, 1953   J. W. BITLER   2,636,581
CLUTCH AND BRAKE DEVICE
Filed Oct. 2, 1948   3 Sheets-Sheet 3
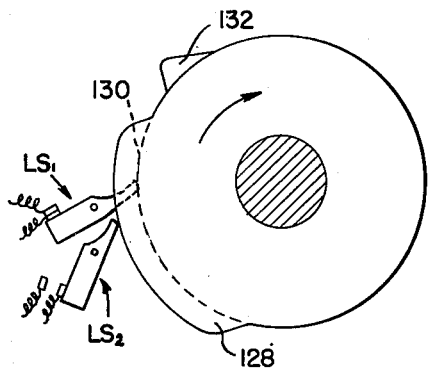
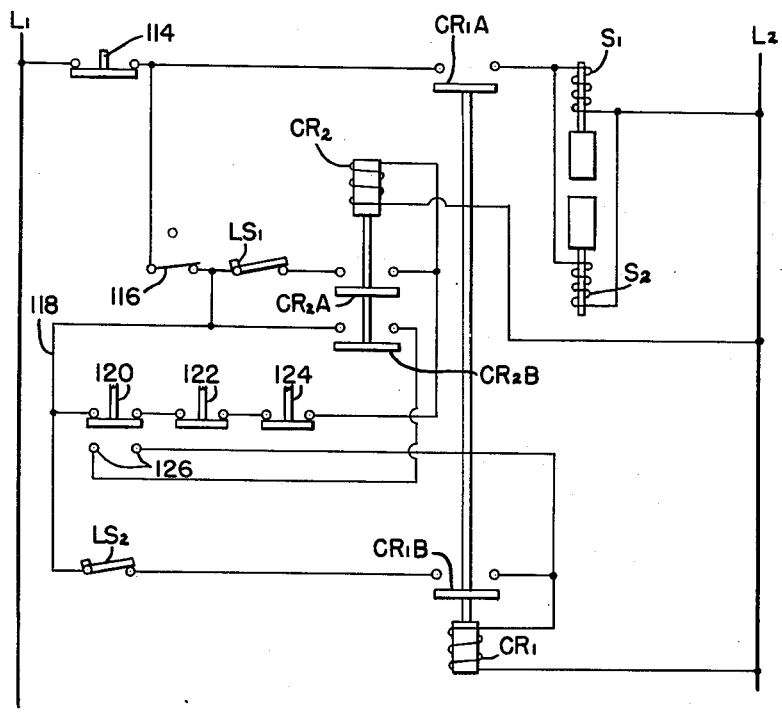
INVENTOR
JOHN W. BITLER
By Toulmin & Toulmin
ATTORNEYS Patented Apr. 28, 1953

2,636,581

UNITED STATES PATENT OFFICE 2,636,581

CLUTCH AND BRAKE DEVICE

John W. Bitler, Minster, Ohio, assignor to The Minster Machine Company, Minster, Ohio, a corporation of Ohio Application October 2, 1948, Serial No. 52,434

6 Claims. (Cl. 192—18)

This invention is concerned with a control system, and especially one adapted for use in connection with friction clutches and the like associated with mechanical presses and similar devices, and with a method of operating such control system.

In mechanical presses, such as punch presses, the customary work operation consists of a single cycle of operations during which the movable ram of the press advances toward and retracts from a stationary bed plate.

By means of die sets or other devices mounted on the said bed plate and ram, such presses may be operated in punching, drawing, and other forming operations.

The majority of such work operations are so arranged that it is necessary for the operator of the press either to remove the formed workpiece, to introduce a workpiece to be formed, or both, by hand so that at least once during each working cycle the operator has his hands and arms in a position where serious injury would result if the press ram were to accidentally carry out a working stroke.

This invention is particularly concerned with a method and apparatus for preventing such accidental repeat operations of the work ram of such a press thereby to minimize the possibility of injuring the press operator.

Many times the dies or other work members mounted on the press ram and bed plate are very expensive tools, and there is a great possibility that an accidental repeat operation of the press ram would cause these work members to come together with the workpiece only partially removed or partially in place therebetween, and thus cause extensive damage to the dies.

This invention is therefore concerned with an improved control system and method of operation thereof for such presses which substantially eliminates the possibility of damaging the work members mounted therein.

A further object of the instant invention is to provide a relatively simple control system for a pneumatically operated friction clutch on a mechanical press which includes safety interlocks, such that it is impossible to operate the press in a working cycle unless all parts of the control system are each operating in the proper manner.

A still further object of this invention is to provide a control system on the friction clutch of a mechanical press in which the control system includes both pneumatic and electrical circuit elements so interlocked that each and every element individually must be operating correctly before it is possible to actuate the said friction clutch and cause the press to perform a working cycle.

These and other objects and advantages will become more apparent upon reference to the following description taken in connection with the accompanying drawings in which:

Figure 1 is an elevational view showing a typical arrangement of a mechanical press including a friction clutch and control system according to this invention;

Figure 2 is an enlarged vertical section taken through the flywheel and clutch mechanism therefor of the press;

Figure 5 is a fragmentary view showing a pair of operating cams and limit switches which form a part of the control system for the clutch;

Figure 6 is a diagrammatic layout of the electric operating circuit which controls the actuation of the pneumatic valves of Figure 3 and which includes the switch arrangement shown in Figure 5; and Figure 7 is a somewhat enlarged fragmentary view showing more in detail the construction of the check valve and operator therefor which controls the shifting of the main air valve.

Figure 3:
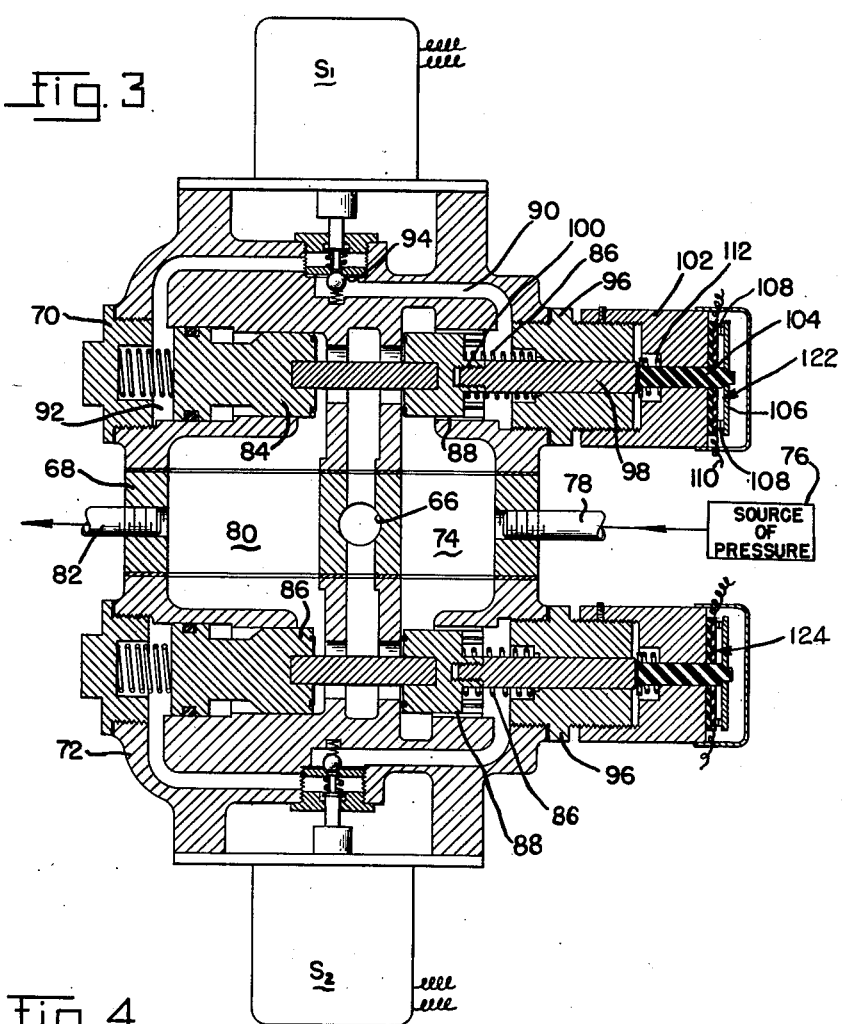
Figure 3 is an enlarged vertical section indicated by the line 3—3 on Figure 2 and showing the arrangement of the pneumatic control valves for the clutch.

Referring to the drawings, the press shown in Figure 1 generally comprises a frame part 10 including a bed member 12, and also including upright side parts 14 on which is slidably guided a reciprocable press ram 16.

The press ram 16 is connected with a crankshaft journaled in the upper part of the side frame members 14 by one or more connecting rods 18, the upper ends of which engage crank pins offset from the line bearing axis of the crank shaft in the usual manner.

Mounted on the lower part of the ram 16 and the upper part of the bed plate 12 are work members, such as punch and die sets, or forming dies, as indicated at 20, and which are brought together by reciprocation of the press ram in order to pressure form, blank, punch, or draw a workpiece.

Turning to Figure 2, the crank shaft of the press is indicated at 22 and it will be observed to extend rightwardly from the right hand side member 14 and to support a flywheel 24 on the anti-friction bearings 26.

The flywheel is normally freely rotatable on the bearings 26 and may be driven in rotation by any suitable power means, such as the V-belt arrangement shown at 28.

For selectively clutching the flywheel 24 to the crank shaft 22 in order to cause the said crank shaft to rotate and thereby to drive the ram 16 in reciprocation, there is provided a friction clutch arrangement generally indicated at 30 in Figure 2. This friction clutch arrangement is quite similar to that illustrated in the Reuben E. Wissman applications Serial Nos. 587,296, filed April 7, 1945, now Patent No. 2,472,452, issued June 7, 1949, and 4,390, filed January 26, 1948, now Patent No. 2,505,600, issued April 25, 1950.

The clutch arrangement includes a plurality of clutch plates 32 which are splined to the flywheel by means of the spline ring 34, and the intermediate clutch plate 36 which is slidably splined to a block 38 which is wedged on the tapered part 40 of the crank shaft 22.

It will be understood that the block 38 can be keyed or pinned to the crank shaft, or that any other means could be provided for insuring a positive driving connection therebetween.

The clutch mechanism also includes a fixed plate 42 secured to the block 38 on one side of the aforementioned group of clutch plates and a movable plate 44 slidably splined to the block 38 on the other side of the said group of clutch plates.

Interposed between the several plates and being secured to alternate thereof in any suitable manner, are the friction discs 46 which effect a driving connection between the plates when the plates are pressed together under pressure.

The plate 44 includes an annular cylinder 48 which receives the piston 50 which is stationary with the block 38.

It will be apparent that introduction of pressure into the cylinder 48 will cause the plate 44 to move rightwardly and to clamp the clutch plate block together and thus effect a driving connection from the flywheel through its splined connection with the plates 32, thence through the friction disc 46 to the plates 36, 42, 44, and then through the block 38 to the crank shaft 22.

Spring means 52 are provided for releasing the pressure on the clutch plate block when the cylinder 48 is exhausted and this spring means acts between the plate 44 and another plate 54, between which is mounted the plate 56 that is held against rotation relative to the press frame by the dowel pins 58.

As in the case of the clutch plate group this group of plates has interposed therebetween the friction material 60 so that when the spring means 52 becomes effective to move the plate 44 away from its clutching position, the plates 44, 54, and 56 cooperate to bring the crank shaft to a halt and to hold it stationary relative to the press frame.

For alternately supplying pressure to and exhausting the annular cylinder 48, there is an air passage 62 extending through the block 38 and the crank shaft 22 to the right hand end of the latter. At this point the said passage makes a connection through a rotary joint 64 with the flow passage 66 in a valve bracket 68.

Turning now to Figure 3, it will be noted that the valve bracket 68 mounts a pair of valves 70 and 72 thereon which are connected in parallel. The valve bracket 68 has air pressure supplied to the chamber 74 thereof from the source of pressure at 76 by a conduit 78 and also has exhaust chamber 80 which connects with the atmosphere by means of the conduit 82.

Fluid connection between the passage 66 leading to the cylinder 48 via the passage 62, and the pressure chamber 74 and exhaust chamber 80 is controlled by the valve member 84 in valve 70 and the valve member 86 in valve 72.

Each of these valve members is normally positioned by spring means 86 to interrupt communication between chamber 74 and passage 66 and to establish communication between passage 66 and exhaust chamber 80.

Each valve includes a passage as indicated at 88 leading from the pressure chamber 74 around the periphery of the right hand portion of the valve member and into a pilot channel 90. This pilot channel leads to the left hand enlarged end of the valve member which is reciprocable in the operating chamber 92.

The flow of pressure through the channels 90 is controlled by the ball check valves 94 which are adapted for operation into flow establishing position by energization of the solenoid S1 associated with the valve 70 and the solenoid S2 associated with the valve 72.

The plungers 91 between the balls 94 and the plungers of the solenoids S1 and S2 are spring urged away from the said balls by springs 93. The plungers are axially and transversely bored as at 95 so that upon de-energization of the solenoids the plungers 91 move outwardly and establish exhaust channels between operating chambers 92 and the atmosphere.

Each of the valves 70 and 72 has a special closure block 96 mounted at the right hand side as viewed in Figure 3, and in axial alignment with the reciprocable valve member thereof.

Each closure block is axially apertured for receiving a push rod 98 which is screw threadedly connected with the right hand end of a reciprocable valve member as indicated at 100.

The blocks 96 are threaded for adjustably receiving a second block 102 which is also axially bored for receiving another push rod 104. The push rod 104 carries at its outer, or right hand end, as viewed in Figure 3, a switch blade 106 which controls the contacts 108 so that when the rod 104 is in its left hand position the circuit is completed between the wires 110 leading to the switch, and when the push rod moves away from its left hand position the said circuit is interrupted.

It will be apparent that movement of either of the valve members 84 or 86 from its left hand position will open the corresponding switch contacts 108. Similarly, the return of either of the said valve members to their left hand positions, will permit the springs 112 associated with the plungers 104 to close the said switches.

Figure 4:
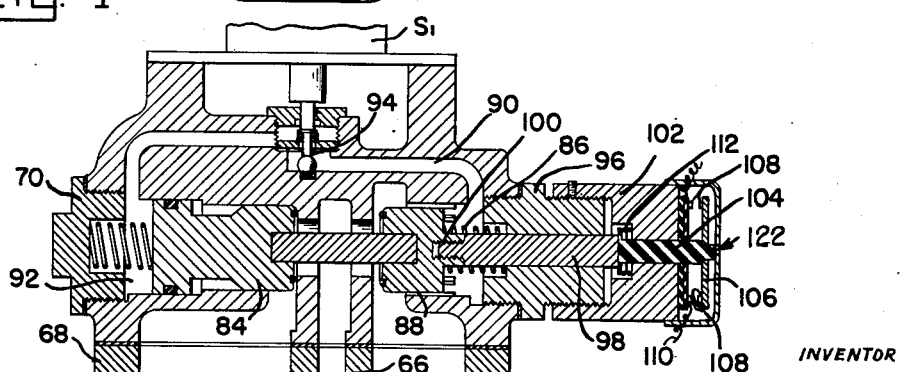
Figure 4 is a fragmentary view showing the upper valve member of the valve arrangement of Figure 3 shifted to its interposition to supply actuating pressure to the friction clutch of the press.

An illustration of the right hand position of the valve member 84 is shown in Figure 4, and in this view it will be noted that the contacts 108 associated therewith are held open.

For controlling the energization of the solenoids S1 and S2 the control circuit illustrated in Figure 6 may be provided. In this figure there are the power lines L1 and L2 and between which the said solenoids S1 and S2 are connected in parallel and through the normal open blades CR1A of the contactor CR1 and the normally closed push button stop switch 114.

A second contactor CR2 has its operating solenoid connected between line L2 and the side of the switch 114 remote from line L1 by a circuit including a selector switch 116 and a line 118 which includes the operating hand or foot switch 120 and the two switches 122 and 124 which comprise the switch elements mounted on the ends of the valves 70 and 72.

A holding circuit is provided for the operating solenoid of CR2 through the blades CR2A of the contactor and the normally closed limit switch LS1. This holding circuit bypasses the aforementioned switches 120, 122, and 124.

The contactor CR2 also includes a blade CR2B and which has one side connected between the switch 116 and LS1 and its other side connected with one of a pair of contacts 126 which are closed by the switch 120 when the latter is pressed to initiate a working cycle of the press.

The other of the contacts 126 is connected with one side of the operating coil of the contactor CR1 and which in turn has its other side connected with the power line L2.

A holding circuit including a blade CR1B of the contactor CR1 and the normally closed limit switch LS2 connects the side of the solenoid CR1 opposite the line L2 with a point between the switch 116 and LS1.

The limit switches LS1 and LS2 are arranged to be operated between their open and closed positions by means of a cam arrangement illustrated in Figure 5. The cam for operating LS2 is in the foreground of the view and is identified by the numeral 128. The cam for operating the switch LS1 is behind the cam 128 in the view and is identified by the numeral 130.

These cams are mounted on the crank shaft 22 or on an auxiliary shaft which is synchronised with the said crank shaft, so that the switches go through one cycle of open and closed position during one rotation of the crank shaft.

The cams and limit switches in Figure 5 are illustrated in the positions which they occupy at the time the crank shaft is halted with the ram of the press in its uppermost position. It will be noted that at the time limit switch LS1 is closed while limit switch LS2 is open.

Operation

In operation, assuming that power is supplied to the lines L1 and L2 and the press is standing idle, with the flywheel being driven and with the ram in its uppermost position, the contactor CR2 will be energized. This energization comes about by means of the circuit that extends from switch 114, switch 116, switches 120, 122 and 124 and then to the operating solenoid of CR2 to line L2.

It will be noted at this time that if either of the switches 122 or 124 is open, indicating that the valve member corresponding thereto is not completely in its left hand position, the operating solenoid of CR2 will not be energized.

Energization of solenoid CR2 establishes a holding circuit to the limit switch LS1 through blade CR2A thereof and the switch 116. Energization of CR2 also closes blade CR2B thereof and prepares an energizing circuit for CR1 from line L1 through switch 114, switch 116, blade CR2B to one of the contacts 126.

Thus, when switch 120 is pressed and the circuit completed between the contacts 126, contactor CR1 is energized and closes blade CR1B and CR1A thereof. The first mentioned of the blades completes a holding circuit for CR1 through the limit switch LS2, switch 116 and switch 114 and line L1. The other of the blades completes the circuit from line L1 through switch 114 and the parallel connected valve actuating solenoids S1 and S2 to line L2.

Energization of S1 and S2 will bring about the simultaneous supplying of pressure to the operating chambers 92 of the valves 70 and 72 and cause these valves to shift rightwardly to occupy the position shown in Figure 4.

At this time pressure passes from the pressure chamber 74 through the valves to the passage 66 and therefrom through the passage 62 to the clutch operating cylinder 48. This causes the friction clutch to connect the flywheel with the crank shaft and commences the said crank shaft to rotating. After somewhat less than 90 degrees of rotation of the crank shaft, the limit switch LS2 is permitted to close by its cam and to complete the holding circuit for relay CR1. At this time the switch 120 may be released and the press will continue to operate.

After about 300 degrees of revolution of the crank shaft the lobe 132 on the cam 130 will engage and open the limit switch LS1. This interrupts the holding circuit for relay CR2 and permits it to open. The opening of CR2 is ineffective at this time to effect contactor CR1 because the latter is being held through the limit switch LS2.

Also the energizing circuit for the contactor CR2 is ineffective to energize it at this time because the switches 122 and 124 are being held in their open position.

After a few more degrees of rotation of the crank shaft the raised part of the cam 128 engages and opens limit switch LS2. This interrupts the holding circuit for the contactor CR1 and permits this contactor to move to its open position, thereby interrupting the energizing circuit for the valve solenoids S1 and S2.

At this time the valve members 84 and 86 of the valves 70 and 72 should return to their left hand position, as illustrated in Figure 3, and exhaust the operating cylinder 48 of the friction clutch, thereby disengaging the clutch and permitting the spring means 52 to set the brake and halt the crank shaft.

It will be apparent that if either of the valve members moves into its left hand position, this function will be accomplished. However, if either of the valve members fails to complete this leftwardly movement, one of the switches 122 or 124 will remain open and prevent reenergization of the contactor CR2.

Since CR2 must be energized in order to prepare an energizing circuit for CR1, it is apparent that unless both of the valve members 84 and 86 carry out their complete cycle of operations and in the predetermined correct manner, the press will come to a halt and it will be impossible to recycle it until the fault in the system has been corrected.

Thus, in addition to greatly reducing the possibility that the press will repeat, by providing multiple air supplying valves, this invention also greatly multiplies the safety factor by the addition of the valve operated switches, both of which must be closed before it is possible to operate the press on a working cycle.

It will be evident that the particular valve arrangement illustrated is not the only one that can be employed in connection with this invention and still obtain the advantages of a very wide margin of safety. For example, the valves could be arranged in tandem rather than parallel and still not be possible to supply the pressure to the clutch operating cylinder if either of the valves failed to shift to its pressure supplying position.

It will also be evident that the particular type of friction clutch and brake illustrated is only representative of any of several types of pneumatically or hydraulically operated devices that could be employed for alternately braking the crank shaft to the press frame and drivably connecting it with the flywheel.

It will be understood that this invention is susceptible to modification in order to adopt it to different usages and conditions and, accordingly, it is desired to comprehend such modifications within this invention as may fall within the scope of the appended claims.

I claim:

1. In a press having a frame, a shaft and a flywheel; a brake normally holding said shaft stationary in said frame, a clutch operable for clutching said shaft to said flywheel; fluid operable means responsive to pressure for making said brake ineffective and said clutch effective; a pair of valves connected in parallel normally exhausting said fluid operable means and shiftable to supply pressure thereto; independent actuators for said valves; a single means for energizing said actuators; other means for de-energizing said actuators; and means responsive to the failure of either of said valves to return to its normal position to make said single means ineffective to energize said actuators.

2. In a press having a frame, a shaft and a flywheel; a brake normally holding said shaft stationary in said frame; a clutch operable for clutching said shaft to said flywheel; fluid operable means responsive to pressure for making said brake ineffective and said clutch effective; a pair of valves connected with said fluid operable means and each having a first position wherein said fluid operable means is connected to exhaust and a second position into which both must be shifted to supply pressure to said fluid operable means while simultaneously interrupting the connection of the fluid operable means to exhaust; independent electrically operated actuators for said valves; a single switch for energizing both said actuators; and other switch means operated by said valves and connected to make said single switch ineffective except when both valves are in their first position.

3. In a press having a frame, a shaft and a flywheel; a brake normally holding said shaft stationary in said frame; a clutch operable for clutching said shaft to said flywheel; fluid operable means responsive to pressure for making said brake ineffective and said clutch effective; a pair of valves connected with said fluid operable means and each having a first position wherein said fluid operable means is exhausted and a second position into which both must be shifted to supply pressure to said fluid operable means; independent electrically operated actuators for said valves; a control circuit for said actuators including a relay energizable to energize said actuators; a first switch for energizing said relay and a holding circuit controlled by said relay bypassing said first switch; and other switch means controlled by said valves and connected to make said first switch effective only when both said valves are in their first position.

4. In a press having a frame, a shaft and a flywheel; a brake normally holding said shaft stationary in said frame; a clutch operable for clutching said shaft to said flywheel; fluid operable means responsive to pressure for making said brake ineffective and said clutch effective; a pair of valves connected with said fluid operable means and each having a first position wherein said fluid operable means is exhausted and a second position into which both must be shifted to supply pressure to said fluid operable means; independent electrically operated actuators for said valves; a control circuit for said actuators including a relay energizable to energize said actuators; a first switch for energizing said relay and a holding circuit controlled by said relay bypassing said first switch; other switch means controlled by said valves and connected to make said first switch effective only when both said valves are in their first position; and means responsive to a predetermined rotary movement of said shaft for de-energizing said relay.

5. In a press having a frame, a shaft, and a flywheel; a brake normally holding said frame; a clutch operable for clutching said shaft to said flywheel; fluid operable means responsive to pressure for making said brake ineffective and said clutch effective; a pair of valves connected with said fluid operable means and each having a first position wherein said fluid operable means is connected to exhaust and a second position into which both must be shifted to supply pressure to said fluid operable means while simultaneously interrupting the connection of the fluid operable means to exhaust; independent electrically operated actuators for said valves; a single switch for energizing both said actuators, a solenoid energizable for closing said single switch to energize said actuator, an energizing circuit for said solenoid, a pair of normally closed control switches in series in said circuit, one of said control switches pertaining to each of said valves, and each switch being arranged to be held open by its pertaining valve except when the said valve is in its said first position.

6. In a mechanical press having a clutch actuable to initiate a working stroke of the press; a fluid operable actuator for the clutch; means for preventing said press from making accidental strokes comprising a plurality of valves connected in circuit with said fluid operable actuator and normally positioned so each provides an exhaust connection from said clutch, each valve being individually shiftable for establishing a supply of actuating fluid to said fluid operable actuator, whereby all of said valves must be shifted to interrupt the exhaust connection from said clutch thereby to make the said supply of actuating fluid effective for causing said fluid operable actuator to actuate said clutch, electrical means energizable for so shifting said valves, and switch means controlled by said valves arranged so that all the valves must be in their unshifted position before said electrical means can be made effective.

JOHN W. BITLER.

References Cited in the file of this patent

UNITED STATES PATENTS

| Number | Name | Date |
|---|---|---|
| 2,065,820 | Mellon | Dec. 29, 1936 |
| 2,095,094 | Glasner | Oct. 5, 1937 |
| 2,198,767 | Glasner | Apr. 30, 1940 |
| 2,226,856 | Gunter | Dec. 31, 1940 |
| 2,285,711 | Hartridge | June 9, 1942 |
| 2,313,187 | Williamson | Mar. 9, 1943 |
| 2,321,171 | Yanchenko | June 8, 1943 |
| 2,331,156 | Alward | Oct. 5, 1943 |
| 2,371,358 | Sekella | Mar. 13, 1945 |